May 6, 1958 R. J. REISS 2,833,274
SPHYGMOMANOMETER
Filed Jan. 17, 1955
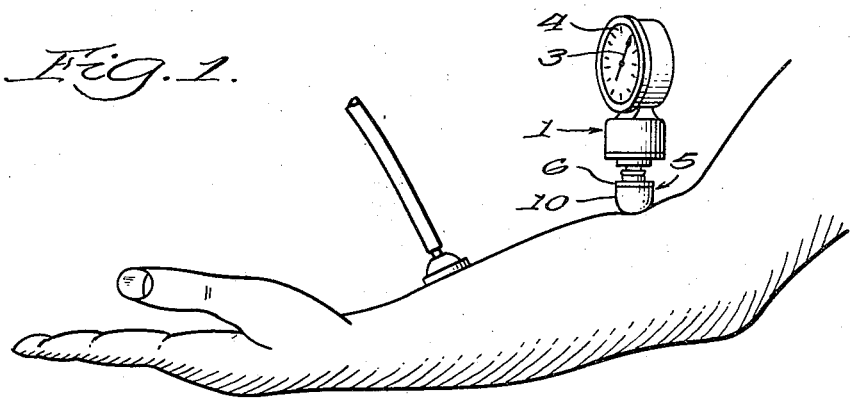
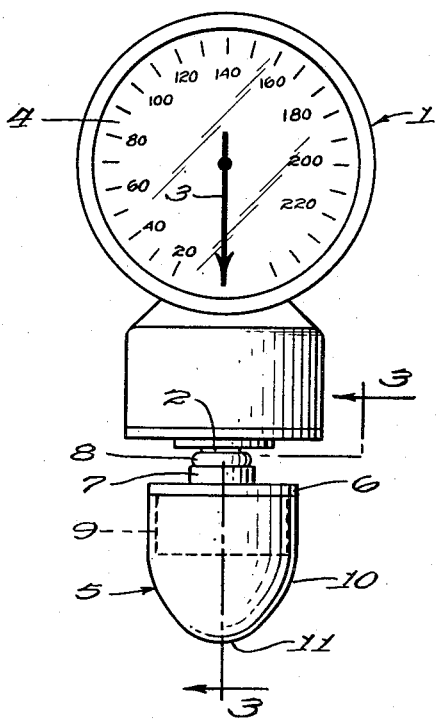
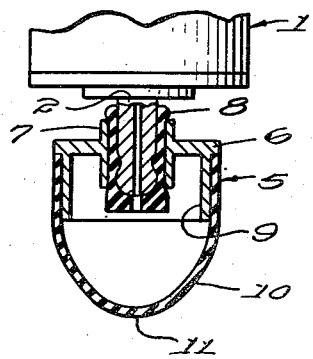
INVENTOR.
Robert J. Reiss.
BY
Harold J. LeVisconte
ATTY.

United States Patent Office 2,833,274
Patented May 6, 1958

2,833,274

SPHYGMOMANOMETER

Robert J. Reiss, Sun Valley, Calif.

Application January 17, 1955, Serial No. 482,003

3 Claims. (Cl. 128—2.05)

This invention relates to sphygmomanometers and more particularly to an improved form thereof adapted to be more readily and conveniently employed to ascertain the blood pressure characteristics of persons.

In general, the practice heretofore has been to gradually apply constrictive pressure around the limb of the patient (usually an arm) until the flow of blood through an artery has been arrested as determined by listening through a stethoscope applied over the artery at a point distal from the point of constriction. Then, upon the gradual release of the constrictive pressure, the beginning of the flow through the artery can be heard and the constrictive pressure is noted on a gauge reading in millimeters of mercury. The pressure thus noted is the diastolic pressure. The pressure is then further gradually released until the sounds of the flow again cease and the pressure is again noted; this being the systolic pressure. The difference between the two pressures is termed the pulse pressure. The constrictive pressure heretofore has been derived from an inflatable cuff connected to a mercury column manometer or to an aneroid type gauge having a dial scale calibrated in millimeters of mercury.

The present invention proposes a simple and more readily applicable means for determining these pressures and has for its principal object the provision a combined pressure applying and indicating instrumentality which can be held in the hand of the user and which by being caused to apply direct pressure over an artery can be employed to apply the required pressures and at the same time to indicate the pressures applied. This more convenient mode of use has the further advantage in the case of children or of nervous patients of being less apt to cause excitement and consequent false readings than the devices currently in use which require the wrapping of the limb with the so-called cuff and then the procedure of inflating and releasing pressure.

A further object of the invention is to provide a device of the above character which is both rugged and compact and consequently more readily carried in the instrument bag carried by physicians or carried from room to room as in a hospital or the like.

With the foregoing objects in view, together with such additional objects and advantages as may subsequently appear, the invention resides in the parts, and in the construction, combination and arrangement of parts, described, by way of example in the following specification of a preferred mode of execution; reference being had to the accompanying drawings which form a part of said specification and in which drawings:

Fig. 1 is a perspective view showing a pressure indicating instrumentality embodying the present invention shown in a typical position of use, Fig. 2 is an enlarged, front elevational view of the instrumentality, and Fig. 3 is a further enlarged, fragmentary sectional view taken on the line 3—3 of Fig. 2.

The illustrated embodiment of the invention comprises an aneroid type pressure indicating instrument 1 of the type heretofore employed in ascertaining blood pressures; said instrument having an inlet nipple 2 through which fluid pressure is conducted to the interior of the instrument with resultant actuation of mechanism within the instrument and indication by a hand 3 on a dial 4 of the static pressure of the fluid; the dial scale being calibrated in millimeters of mercury. The nipple 2 is customarily connected by a hose to the heretofore used inflatable limb surrounding cuff. In the present invention, the nipple has attached thereto a resiliently flexible bulb means generally designated 5 and comprising a circular, disc like base element 6 having a centrally disposed sleeve portion 7 extending above and below the base element and surrounding the nipple 2 with a tubular gasket element 8 interposed therebetween to make an air tight seal. The base element extends laterally away from the sleeve X and terminates in a depending annular sleeve portion 9 on which is mounted a generally cup-shaped, resiliently flexible bulb element 10 having its edge adhesively or otherwise secured thereto to effect an air-tight joint. The end 11 of the bulb 10 is preferably rounded and generated about a radius smaller than the radius of the portion attached to the sleeve portion 9 giving the end of the bulb a bluntly tapered configuration as best shown in Fig. 3.

A typical use is illustrated in Fig. 1 in which the bulb of the instrument is placed above the radial artery in the cubital space of the elbow and a stethoscope is applied above the artery at a point distal thereto. Upon the application of downward pressure on the instrument with resultant constriction of the artery and creation of pressure within the instrument bulb equal to the pressure applied to the artery, the sounds of the blood flowing through the artery can be heard in the stethoscope until the pressure is sufficient to halt flow through the artery. The point at which the sounds cease as indicated on the instrument dial, is the systolic pressure. Upon gradual release of the pressure by the instrument the sounds become noticeable and at the point at which the sounds cease by reason of the removal of restriction the pressure is again noted to record the diastolic pressure. It is not necessary to follow the above routine with the present invention since the diastolic pressure may first be noted if desired and then by application of increased pressure, the systolic pressure can be ascertained. The instrument has the further advantage that repeated checks on either or both pressures can be readily and quickly made by the variation of the pressure applied by the instrument. Moreover in the use of the instrument, there is less liability that nervous or excitable patients will be disturbed by the simple procedure involved in its use and hence the data obtained is more likely to be accurate. Additionally, the compact form of the illustrated embodiment of the invention permits it to be readily carried in an instrument bag and quickly put into use through saving the time heretofore required to set up the instrument and then attach the instrument to the patient. The instrument is equally advantageous for hospital use for the same reasons.

While the above described embodiment of the invention is preferable, it will be appreciated that the resiliently flexible bulb may equally well be connected to a mercury column manometer instead of the aneroid type gauge shown.

While the foregoing specification discloses the best embodiment of the invention presently known, it is not to be inferred therefrom that the invention is limited to the specific form described, and it will be understood that the invention includes all such changes and modifications in the parts and in the construction, combination and arrangement of parts as shall come within the purview of the appended claims.

I claim:

1. In a sphygmomanometer, the combination of a fluid pressure responsive gauge including devices for visually indicating the extent of applied pressure and having a nipple containing an orifice extending from said devices to the exterior of said gauge, pressure creating devices attached to said nipple comprising a base element having an opening surrounding said nipple and connected thereto by an interposed packing and a resiliently flexible bulb having an open end attached to said base element by means effecting an air-tight seal therebetween and having the interior thereof in direct communication with said orifice with resultant transmission to said devices of fluid pressure deriving from exteriorly applied compression on said bulb.

2. A sphygmomanometer as claimed in claim 1 in which said base element comprises a rigid, annular member having an opening in the center thereof through which said nipple extends and an annular skirt portion, and in which said bulb comprises a generally cup-shaped, resiliently flexible member having the edge thereof secured to the periphery of said skirt portion.

3. A sphygmomanometer as claimed in claim 2 in which said bulb element is formed with a buntly tapered, body contacting surface.

References Cited in the file of this patent

UNITED STATES PATENTS 1,900,285    Huber  ---------------- Mar. 7, 1933

FOREIGN PATENTS 38,529    Germany  -------------- Mar. 14, 1887
882,590    Germany  -------------- July 9, 1953